United States Patent
Baum (10) Patent No.: US 6,256,610 B1
(45) Date of Patent: Jul. 3, 2001

(54) HEADER/FOOTER AVOIDANCE FOR READING SYSTEM

(75) Inventor: Stephen R. Baum, Needham, MA (US)

(73) Assignee: Lernout & Hauspie Speech Products N.V., Ieper (BE)

( * ) Notice: Subject to any disclaimer, the term of this patent is extended or adjusted under 35 U.S.C. 154(b) by 0 days.

(21) Appl. No.: 09/223,136

(22) Filed: Dec. 30, 1998

(51) Int. Cl.⁷ .............. G10L 13/08; G10L 15/08; G06K 19/18
(52) U.S. Cl. .............. 704/260; 704/270; 704/231; 382/182
(58) Field of Search .............. 704/260, 258, 704/271, 270; 379/88.13

(56) References Cited

U.S. PATENT DOCUMENTS

| | | | |
|---|---|---|---|
| 5,091,931 | * | 2/1992 | Milewski .............. 379/100 |
| 5,572,625 | * | 11/1996 | Raman et al. .............. 704/260 |
| 5,634,084 | * | 5/1997 | Malsheen et al. .............. 704/260 |
| 5,699,486 | * | 12/1997 | Tullis et al. .............. 704/270 |
| 5,850,629 | * | 12/1998 | Holm et al. .............. 704/270 |
| 5,893,901 | * | 4/1999 | Maki .............. 704/260 |
| 5,903,867 | * | 5/1999 | Watari et al. .............. 704/270 |

* cited by examiner

Primary Examiner—Tālivaldis I. Šmits
Assistant Examiner—Daniel A. Nolan
(74) Attorney, Agent, or Firm—Bromberg & Sunstein LLP (57) ABSTRACT

A computer program product residing on a computer readable medium for avoiding headers/footers while synthesizing speech for a reading machine includes instructions for causing the reading machine to determine if text in regions of a document correspond to text of a header or a footer and synthesize speech to read the document aloud to a user of the reading machine, while ignoring those portions of the document that correspond to a header or footer.

25 Claims, 6 Drawing Sheets

HEADER/FOOTER AVOIDANCE FOR READING SYSTEM

BACKGROUND

This invention relates to reading machines which are used as part of a remedial reading program to assist individuals with learning disabilities or severe visual impairments or blindness.

Reading machines have been used to improve the educational attainment of individuals with learning disabilities. They have also been used by persons having visual impairment or blindness. Reading machines often include a personal computer having specialized software that provides a reading machine function to the computer. In addition, the reading machines include other PC type components such as a monitor, an audio system, a disk or mass storage device, and a keyboard. In general, reading machines for blind persons may not include a monitor and pointing device, whereas those for individuals with learning disabilities will include a monitor and printing device. In general, specialized software processes an input source document and generates synthetic speech to enable a user to hear the computer read through the document a word, line, sentence etc. at a time. Often these reading machines include a scanner to provide one technique to input source documents to the reader.

Often input source documents such as those which have been scanned by a scanner or text documents include headers and footers on each page or odd pages and so forth. When a reading machine synthesizes speech for such input source documents it will synthesize speech corresponding to the headers and footers. Thus, if a header and a footer exists on each page, the header and footer will be read each time it is encountered. Moreover, for headers and footers that contain page numbers, speech corresponding to the page numbers will be synthesized each time that the page number is encountered. For a user of a reading machine this could be annoying.

SUMMARY

According to an aspect of the invention, a method of operating a reading machine includes retrieving a page of text, determining if the page of text includes a header or a footer, and synthesizing speech to read the page of text to a user of the reading machine.

According to a still further aspect of the invention, a computer program product residing on a computer readable medium for avoiding headers/footers while synthesizing speech for a reading machine includes instructions for causing the reading machine to retrieve a page of text and determine if the page of text includes a header or a footer. The computer program product will include instructions to synthesize speech to read the page of text to a user of the reading machine.

According to a still further aspect of the invention, a method of operating a reading machine includes determining if text in regions of a document correspond to text of a header or a footer and synthesizing speech to read the document aloud to a user of the reading machine, while ignoring those portions of the document that correspond to a header or footer.

According to a still further aspect of the invention, a computer program product residing on a computer readable medium for avoiding headers/footers while synthesizing speech for a reading machine includes instructions for causing the reading machine to determine if text in regions of a document correspond to text of a header or a footer and synthesize speech to read the document aloud to a user of the reading machine, while ignoring those portions of the document that correspond to a header or footer.

According to a still further aspect of the invention, a reading machine includes a computer system including a processor and a computer storage medium. The computer storage medium includes a computer program including instructions that cause the processor to determine if text in regions of a document correspond to text of a header or a footer and synthesize speech to read the document aloud to a user of the reading machine, while ignoring those portions of the document that correspond to a header or footer. The reading machine also includes an audio system including speakers to transduce the converted text into speech that is read aloud to the user.

One or more of the following advantages are provided by one or more aspects of the invention. The header/footer avoidance filter will ignore headers and/or footers that exist in the document, or will ignore those that have been previously synthesized by the speech synthesizer, but will synthesize speech for the first time that the header and/or footer is encountered in the document.

BRIEF DESCRIPTION OF THE DRAWINGS

The foregoing features and other aspects of the invention will be described further in detail by the accompanying drawings, in which.

DETAILED DESCRIPTION

Figure 1:
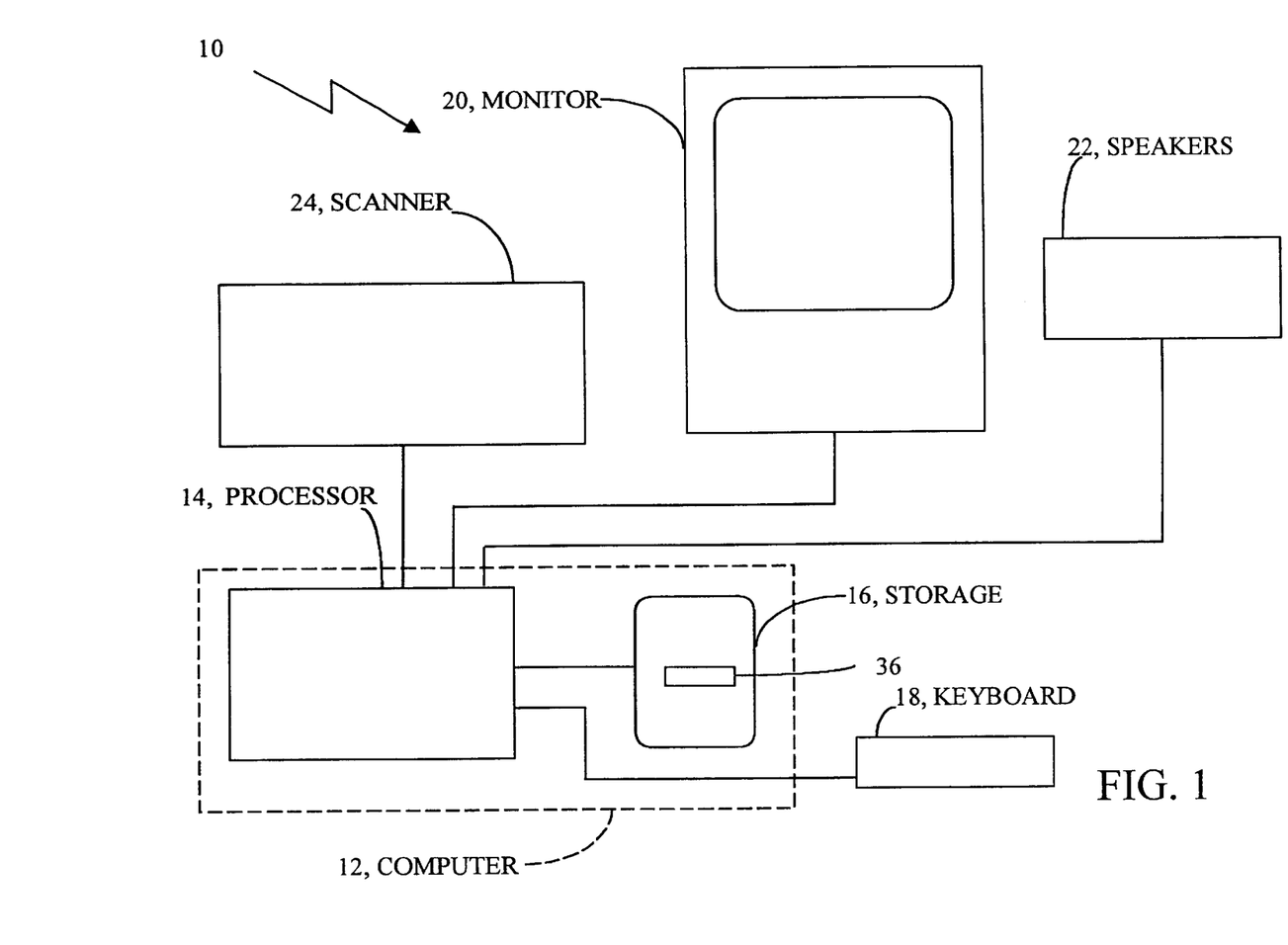
FIG. 1 is a block diagram view of a reading system.

Referring now to FIG. 1, a reading machine 10 is shown to include a computer system 12. The computer system 12 is generally a personal computer or can alternatively be another type of computer and typically includes a central processor unit (not shown) that is part of a processor 14. A preferred implementation of the processor 14 is a Pentium® based system from Intel Corporation, Santa Clara, Calif., although other processors could alternatively be used. In addition to the CPU, the processor includes main memory, cache memory and bus interface circuits (not shown). The computer system 12 includes a mass storage element 16, here typically the hard drive associated with personal computer systems.

The reading system 10 described here is that which is typically used by a person with learning disabilities and thus further includes a standard PC type keyboard 18, a sound card (not shown), a monitor 20 as well as speakers 22, a pointing device such as a mouse 19 and a scanner 24 all coupled to various ports of the computer system 10 via appropriate interfaces and software drivers (not shown). The computer system 12 here operates under a WindowsNT®

Microsoft Corporation operating system although other systems could alternatively be used.

For blind persons or visually impaired persons often a monitor and pointing device are not used and such blind or visually impaired persons navigate through a document using page numbers or moving forward or backward by page, line, paragraph, etc. using a special keypad or keyboard. No pointing device or monitor are necessary. One technique is described in U.S. patent application Ser. No. 08/884,591, filed Jun. 27, 1997, entitled "READING MACHINE SYSTEM FOR THE BLIND HAVING A DICTIONARY" by Raymond C. Kurzweil et al. and which is incorporated herein by reference.

Resident on the mass storage element 16 is image display and conversion software 30 (FIG. 2) that controls the display of a scanned image provided from scanner 24. In addition, the software 30 permits the user to control various features of the reader by referencing the image representation of the document displayed by the monitor. The software includes a header/footer avoidance filter 60 (FIG. 3). The header/footer avoidance filter 60, to be described in conjunction with FIGS. 3–6, can operate on a text file, a text file that is produced from an optical character recognition process, or any file that contains lines of text organized in a series of pages. Below is described an example of using the header/footer filter 60 in the context of the reading system 10 that scans an input document and produces an image file that is displayed and to which synchronized speech and highlighting are added. Other examples can be used.

Figure 2:
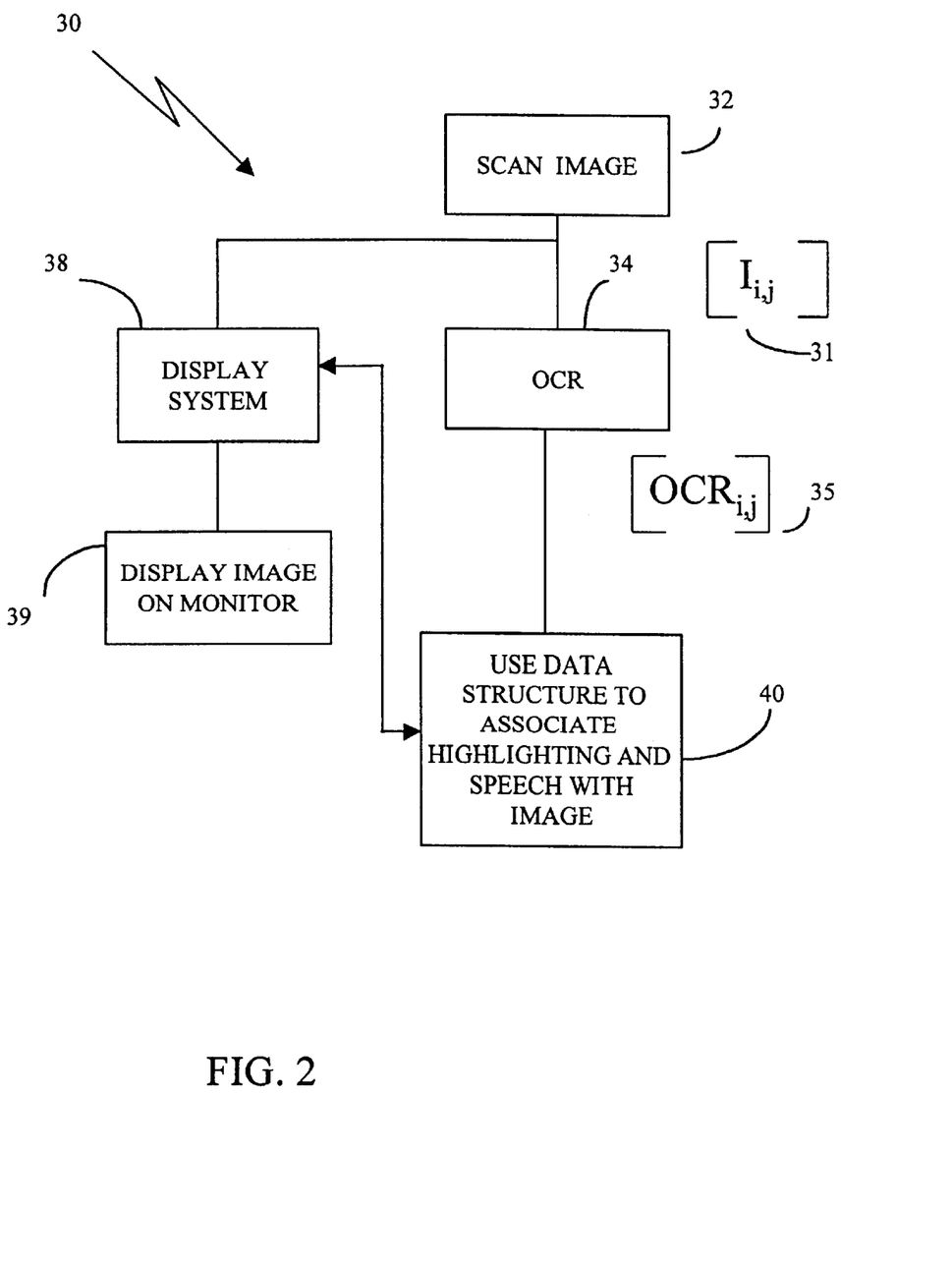
FIG. 2 is a flow chart showing steps used in displaying a scanned image representation of a document for use in the reading system of FIG. 1.
Figure 3:
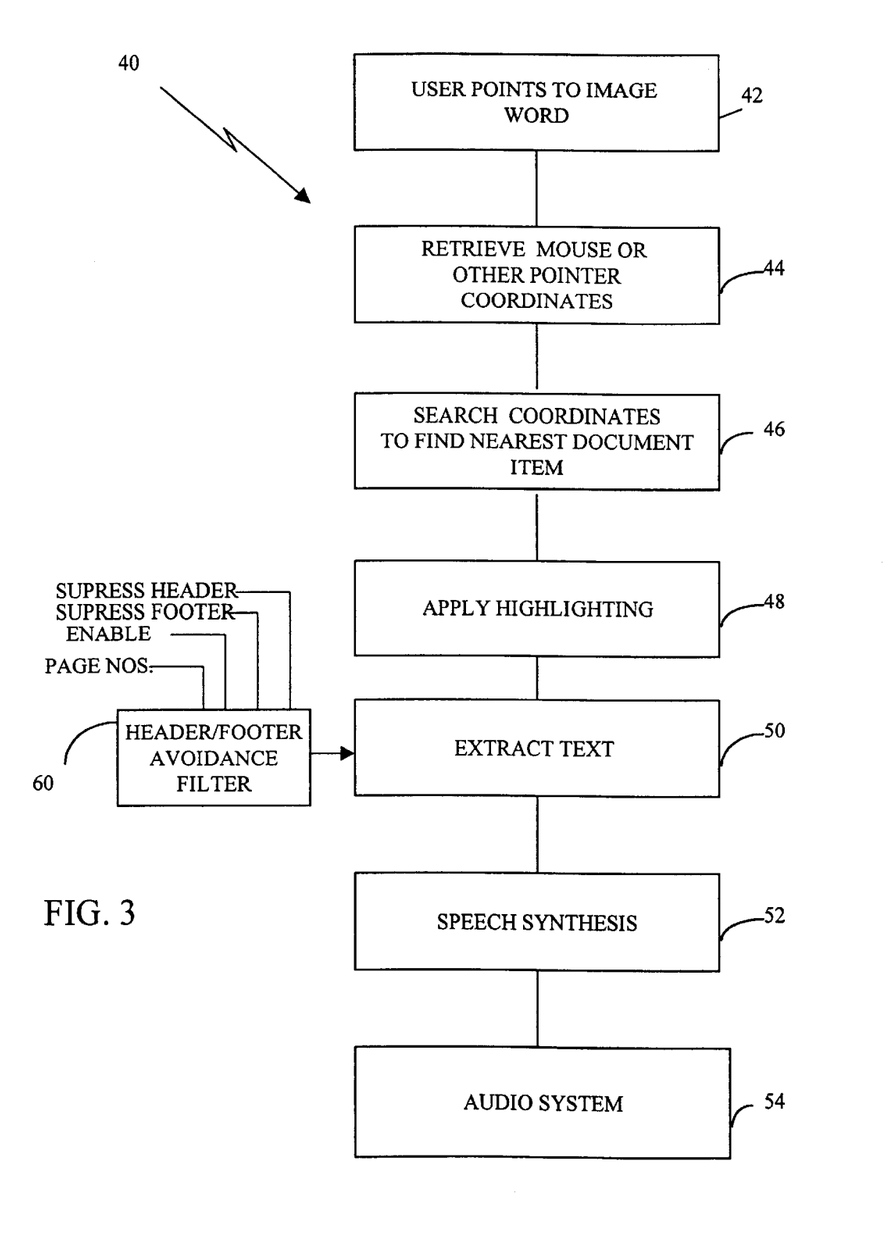
FIG. 3 is a flow chart showing steps used to associate user selected text on the displayed image representation to OCR generated text to permit voice synthesis and highlighting of the image representation.

Referring now to FIG. 2, the image display and conversion software 30 scans, at 32, an input document to provide an image file. In general, the input document is scanned in a conventional manner and produces an image file 31 which is fed to an optical character recognition (OCR) module 34. The OCR module 34 uses conventional optical character recognition techniques on the data provided from the scanned image 32 to produce a text file 35. Alternatively, image-like representations can be used as a source such as a stored bit-mapped version of a document.

The image file 31 is also fed to a display system 38 which in a conventional manner processes the image file for display 39 on the monitor. As shown, the text file 35 provides an input along with other commands driven by the operating system (not shown) to a module 40 which is used to associate user initiated actions with an image representative of a scanned document. In addition, both the image file 31 and the text file 35 can be stored in the reading system for use during the session and can be permanently stored for latter use. The files are stored using generally conventional techniques common to WindowsNT® or other types of operating systems.

A preferred technique for the image display and conversion software 30 is described in a copending application Ser. No. 08/883,686 filed on Jun. 27, 1997 entitled "Reading System Displaying Scanned Images with Dual Highlighting" by Raymond C. Kurzweil et al. and incorporated herein by reference.

If the reading system is for a blind or visually impaired person and does not have a monitor or printing device, then the system can operate much like that described in application mentioned above. That is, the user will navigate through the document using a specialized keypad. The above application "READING MACHINE SYSTEM FOR THE BLIND HAVING A DICTIONARY" describes an embodiment using a specialized keypad.

Referring now to FIG. 3, the user controls operation of the reading system 10 with reference to the image displayed on the monitor 20 as shown by the software module 40. A user can initiate reading of the scanned document at the beginning of the document by selecting a reading mode. One reading mode is a continuous reading mode in which the reading machine 10 starts at the beginning of the document and reads all encountered text in the document.

Alternatively, the user can have the document start reading from any point in the document by illustratively pointing, at 42, to the image representation of an item from the scanned document displayed on the monitor. The document item can be the actual image representation of the scanned document rather than the conventional text file representation. The item can be a single word of text, a line, sentence, paragraph, region and so forth. The user activates a feature to enable the reading machine to generate synthesized speech associated with the selected image representation of the document item. Preferred searching 46 techniques are described in the above pending application.

After retrieving the mouse or other pointer coordinates at 44 and the nearest word or nearest document item has been determined 46, highlighting is applied, at 48, to an area associated with the item or word. The text corresponding to the nearest document item is also extracted, at 50. The text representation is fed to a speech synthesizer 52 to produced electrical signals corresponding to speech. The electrical signals are fed to the audio system 54 to produce speech corresponding to the nearest document item while the monitor 20 displays the item and highlighting is applied to the item. For a reading system used by a blind person, the user can have the reading machine read at any point by contacting it through the keypad.

The reading machine 10 can include a header/footer avoidance filter 60. The header/footer avoidance filter 60 can filter the text file 35 prior to being sent to a speech synthesizer 52 in order to determine whether the text file 35 includes information corresponding to a header or footer, and therefore whether the text associated with a header or footer should be read by the reading machine 10. It may be desirable to configure the header/footer avoidance filter 60 to read unique header/footers when such unique header/footers are first encountered and to suppress synthesizing speech for the header/footer each time it is repeated in the source document. Thus the header/footer filter 60 can be configured with suppress header, suppress footer, enable, read page number messages, and so forth. One mode, described below, suppresses reading of all headers and footers.

A page header has one or more lines of text beginning with the first line of a page, which, with the exception of a possible page number field, are identical to corresponding lines of text on a nearby page. A nearby page can be considered as the page before, the page after, or two pages before, or two pages after the current page and so forth. A page footer is the same, except that it has the last line or lines of text on a page.

A user controls the system 10 to read from a particular point, the system 10 will begin from that point, even if it is within a page header or footer. The filter 60 identify any headers and/or footers on the current page. If reading begins before the footer, the filter 60 can skip the footer. The filter can automatically advance to the next page, and the filter 60 will identify the header and footer on that page, and skip both, reading only the text between them. That is, if the operator chooses to begin reading at the beginning of a particular page the process will read the header. The process can skip headers and footers only when the system itself is automatically advancing from one page to another.

For example, the header footer avoidance filter 60 modifies the behavior of the system during continuous reading of a page from a document. The page read will start at an offset indicating where reading should begin on the page (corresponding to a cursor in a document, where 0 indicates that reading should start at the top of the page typically), an indication of whether or not page headers are ignored, and an indication of whether or not page footers are ignored. The reading machine 10 has a setting that indicates whether or not headers and footers should be ignored. The following description presumes that the setting is set such that they should be ignored.

The operator starts the reading process from the current position in the document. The reading machine 10 can indicates that the filter 60 should not ignore page headers for the first page being read. Once the first page is completed normally (i.e., the operator doesn't interrupt the reading for some reason), subsequent pages are read such that page headers are ignored. Page footers can always be ignored. The reading system 10 is passed an offset number "n", e.g. from the filter 60, where "n" is the character offset indicating the starting position for the page. The filter 60 calculates a number "m", where "m" is the character offset of the last character on the page. If page headers are to be ignored, the mechanism will call a separate mechanism to find a number "h", which is the first character offset beyond the end of the page header. If "h" is greater than "n", it replaces "n". If page footers are to be ignored, the mechanism will call a separate mechanism to find the number "f", which is the last character offset immediately before the start of the page footer. If "f" is less than "m", it replaces "m."

The mechanism then queues the reading of the text, beginning at character offset "n" and ending at character offset "m." That is, the mechanism reads the text beginning at either the offset "n" or "h", whichever is greater, and ending at the offset "m" or "f", whichever is less. Note that if "n" is greater than "m", and "m" is not the last character offset on the page, the reading will be between "n" and the last character offset, not "n" and "m." These offsets are determined from character positions in the OCR text file.

Figure 4:
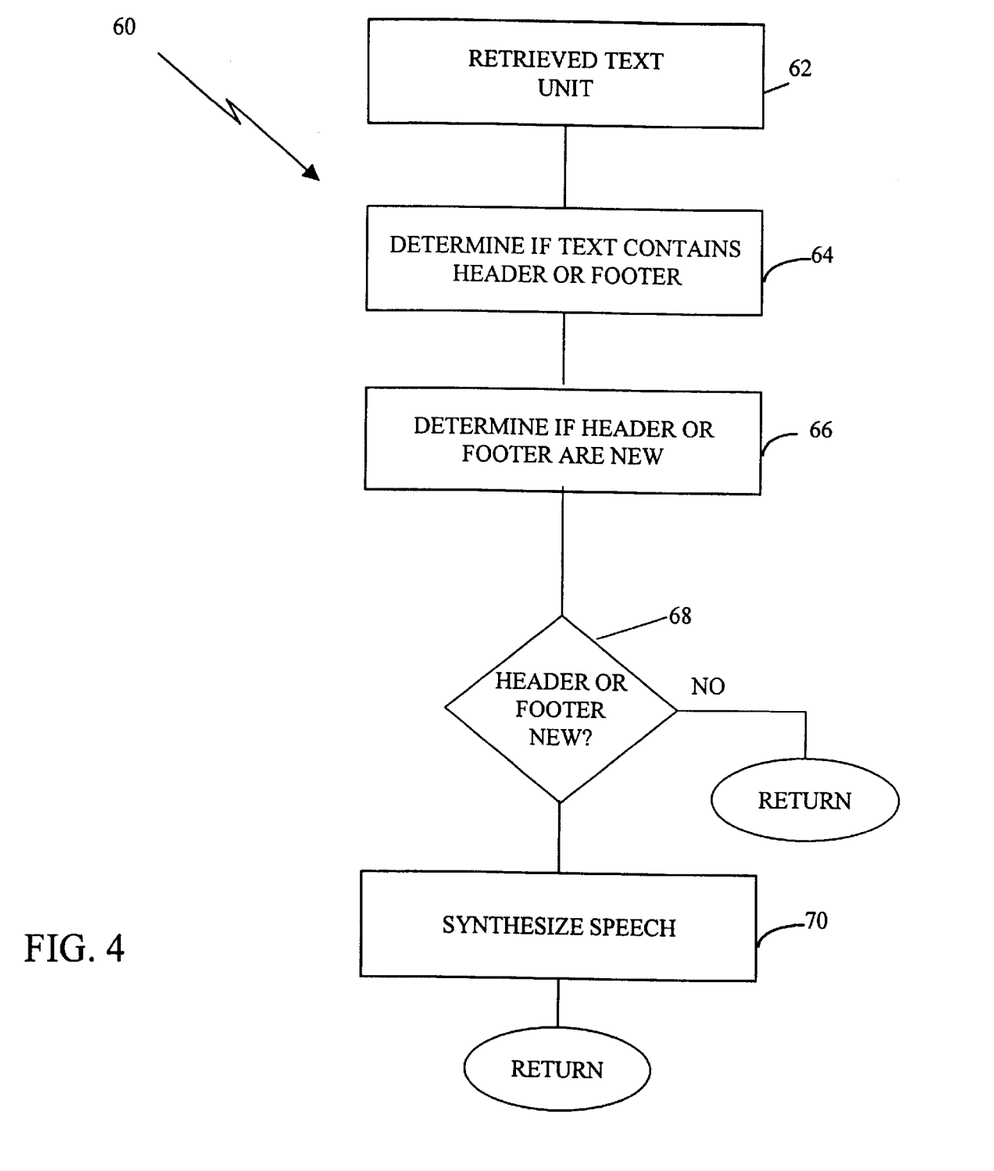
FIG. 4 is a flow chart showing a process to avoid repetitive reading of headers/footers.

Referring now to FIG. 4, the header avoidance filter 60 retrieves at operation 62 the scanned material that typically corresponds to a page of a document and will determine, at 64, if the page contains a header and/or a footer. The header/footer avoidance filter 60 identifies those regions of a page of text that are within the header of the page, or the footer of the page. The filter 60 is fed a page number corresponding to the current page. The filter retrieves the text from any particular page in the active document based on its page number, without affecting the user's notion of what page the machine is reading from. The filter 60 thus operates in a background mode. The filter 60 has a memory cache of relevant lines from various pages of the active document. That cache is cleared when the user changes documents.

When the filter 60 needs lines of text from another page, it will first attempt to get them from the cache. If they are not in the cache, the filter will load a set of lines of text from the requested page into the cache. The cache exists for speed reasons, and is not an essential part of this mechanism. Also for speed reasons, only the first three lines and the last three lines of each page are considered as possibly being a part of a header or a footer. That number could vary depending upon implementation, or one could use another technique such as to limit the number of lines based on the probable presence of a blank line between the header and the body of text, or between the body of text and a footer.

In one embodiment, if the page contains a header and/or footer, the filter 60 determines, at 66, if the header and/or footer are new. If either the header and/or the footer are new 68, the filter 60 will store the new header/footer and send the text corresponding to the header and/or footer to the speech synthesizer to synthesize speech, at 70, for the new header/footer and return control to the speech synthesizer 52 to read aloud the rest of the document. Otherwise, if the filter 60 determines that the header and/or footer are not new, the filter 60 will return without synthesizing any speech for the header and/or footer and the process 30 will continue to synthesize speech for the rest of the document.

In this manner, the header/footer avoidance filter 60 will ignore headers and/or footers that have been previously synthesized by the speech synthesizer, but will synthesize speech for the first time that the header and/or footer is encountered in the document.

Figure 5:
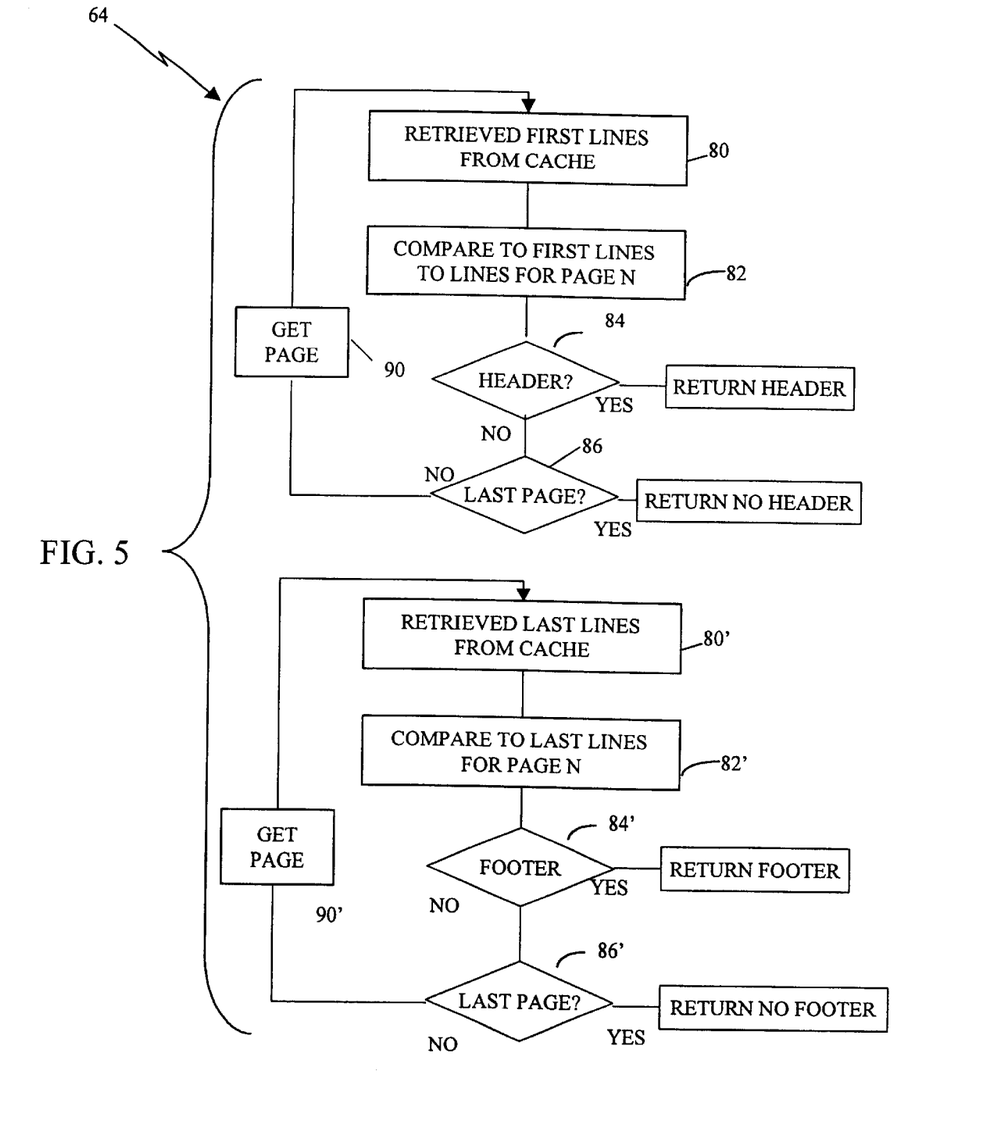
FIG. 5 is a flow chart of an embodiment of the process of FIG. 4.

Referring now to FIG. 5, a process 64 (FIG. 4) to determine a header and footer is shown. The determining process 64 retrieves, at 80, first lines of the requested page and a page that will be compared to the requested page. The process will compares, at 82, text on the requested page to text from other pages here up to four other pages. The determining process 64 stops the comparison when it detects a header 84 or has checked 86 all pages. The determining process 64 first compares the requested page to the previous page, then if a header is not found it will get, at 90, additional pages. The order can be to compare to the next page, then to the page before the previous page, then to the page after the next page. That is, given a page number N, the determining process 64 will compare the first three lines of text on page N first to the first three lines of text on page N−1, then to N+1, then to N−2, then N+2. A comparison for a page header for two pages will first compare the first lines on the two pages. If the first lines on the two pages do not match, the comparison is ended for those two pages. If lines do match, the second lines of the two pages are compared. The process 64 will continue down the page until it reaches the limit of the lines to be considered, e.g., three lines in this example, or until two lines do not match. A header is considered identified when one or more lines match. The value of "h" can be calculated based upon the position of the last character of the determined header.

The determining process 64 will perform similar processing for the last three lines of text from each page to identify a footer. That is the determining process 64 will retrieve, at 80', last lines of a page, compare, at 82', the lines, determine, at 84', if a footer and determine if it has the last page to compare, at 86'. If not the last page, it will get additional pages, at 90', until either a footer is detected, at 84', or all pages have been checked, at 86'. The value of "f" can be calculated based upon the position of the first character of the determined footer.

Thus, determining process 64 tests two pages prior to the current page and two pages subsequent to the current page to determine whether or not the encountered text corresponds to a header and a footer and in some embodiments whether it corresponds to a new header and footer. In one embodiment, the determining process 64 can test to determine if an identified header or footer is a new header or footer. If the header or footer are new, the system 10 can synthesize speech for the new header/footer, the first time that the machine encounters it. A header or footer is considered old if it matches text found on the previous page, or the page before the previous page. Otherwise, (i.e., if it matches text found on the next page or the page after the next page) it is considered new. Note that in determining whether a footer or header are new may change the order of the page comparisons described above. The determining process would compare a current page N with page number N−1, then page number N−2, then page number N+1, and then page number N+2.

Figure 6:
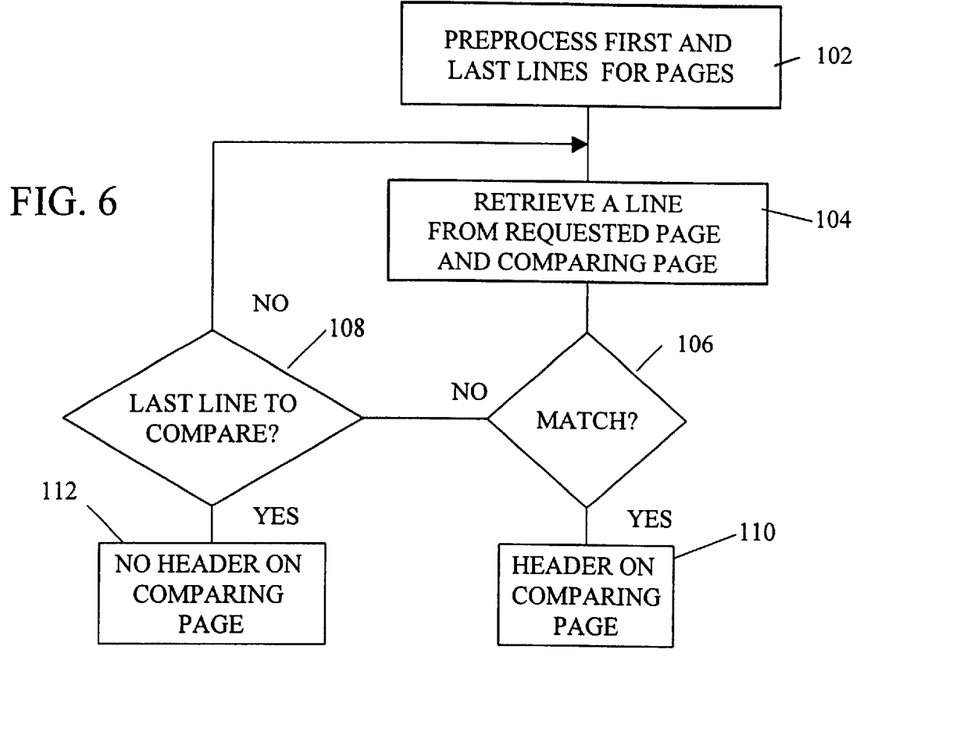
FIG. 6 is a flow chart of a process to compare headers.

Referring now to FIG. 6, a process 100 to determine a potential header includes preprocessing the first plurality of lines e.g., three lines (and last plurality of lines e.g., three lines for a footer) in each page and fetching, at 104, a first line $L_f$ of the header $H_N$ and a first line $L_i$ of the requested header $H_n$. The preprocessing, at 102 replaces consecutive sequences of blanks or tab characters with single spaces, and replaces all words containing only numeric digits with a single identical digit. The preprocessing 112 can be performed when the lines are first loaded from the page into the cache.

Matching, at 106, of two preprocessed lines uses a standard linear programming technique that determines the minimum number of characters that would have to be added, deleted, or changed in order to convert one line of text into the other. That result, a mismatch number, is compared to the lower of two numbers: either one fifth of the length in characters of the longest line, or the number 10. These, of course, are tuning parameters which could be adjusted for different types of input. This algorithm assumes that the input is an OCR text file that is likely to contain errors. If the mismatch number exceeds the error limit, the match fails. Otherwise, it succeeds. Similar processing occurs for the footer except that the last three lines are used. If there is a match a "header on comparing page" message is returned, at 110. If there is no match and it is the last line to compare, at 108, then a "no header on comparing page" message 112 is returned otherwise it will get the next lines.

For headers and/or footers that may include page numbers, a special process can be used to handle the page numbers. For example, the header/footer avoidance filter 60 can simply be set to read each one of the page numbers as the page of text is read by the reading machine. Alternatively, the header/footer avoidance filter can be used to suppress the page numbers. Thus, for example, in the preprocessing 112 when a page number is encountered, the preprocessing 112, as mentioned above, can replace the page number with a default page number. Thus, each time that the header and/or footer having the page number is encountered, it will see the same default page number and thus avoid subsequently synthesizing speech for the page number. The reason for the digit preprocessing described above is to eliminate the expected mismatch that occurs between header or footer lines due to a page number. It is also possible that the process could identify that mismatch, and use it as an indicator that a particular word is, in fact, a page number.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method of operating a reading machine comprises:
   retrieving a page of text;
   determining if the page of text includes a page header or a page footer;
   synthesizing speech to read the page of text to a user of the reading machine.

2. The method of claim 1 further comprising:
   determining if the header or footer is a new header or footer;
   synthesizing speech to read the new header or footer to a user of the reading machine and not synthesizing speech to read the header or footer if it is not new.

3. The method of claim 1 wherein determining if the page has a header and/or footer comprises:
   determining if lines of text on a page correspond to lines of text on pages preceding or succeeding the page.

4. The method of claim 2 wherein determining if the header and/or footer is new comprises:
   determining if lines of text on a page correspond to lines of text on pages preceding the page.

5. The method of claim 3 wherein determining differences comprises:
   preprocessing lines of text to remove errors induced by optical character recognition software.

6. The method of claim 5 wherein the first three lines of a requested page are compared in sequence to the first three lines of a comparing page to determine whether the requested page contains a header.

7. The method of claim 5 wherein the last three lines of a requested page are compared in sequence to the last three lines of a comparing page to determine whether the requested page contains a footer.

8. The method of claim 6 wherein in the first three lines of the requesting page and the comparing page, any numbers in said lines are replaced with the same number.

9. The method of claim 7 wherein in the last three lines of the requesting page and the comparing page, any numbers in said lines are replaced with the same number.

10. A computer program product residing on a computer readable medium for avoiding headers/footers while synthesizing speech for a reading machine comprises instructions for causing the reading machine to:
    retrieve a page of text;
    determine if the page of text includes a page header or a page footer;
    synthesize speech to read the page of text to a user of the reading machine.

11. The computer program product of claim 10 wherein the instructions to determine if the page has a header or footer will cause a computer to:
    synthesize speech to read a new header or a new footer to a user of the reading machine and to read that text which is not a part of a page header or footer, while not reading repetitive headers and footers.

12. The computer program product of claim 10 wherein instructions to determine if the page has a header and/or footer comprises instructions to determine if lines of text on a page correspond to lines of text on pages preceding the requested page.

13. The computer program product of claim 10 wherein instructions that determine differences further comprise instructions to cause a computer to:
    preprocessing lines of text to remove errors induced by optical character recognition software.

14. The computer program product of claim 13 wherein instructions that compare comprise instructions that compare the first three lines of a requested page, in sequence, to the first three lines of a comparing page to determine whether the requested page contains a header.

15. The computer program product of claim 13 wherein instructions that compare comprise instructions that compare the last three lines of a requested page, in sequence, to the last three lines of a comparing page to determine whether the requested page contains a footer.

16. The computer program product of claim 14 wherein instructions that compare comprise instructions that replace in the first three lines of the requesting page and the comparing page, any numbers in said lines with the same number.

17. The computer program product of claim 15 wherein instructions that compare comprise instructions that replace in the last three lines of the requesting page and the comparing page, any numbers in said lines with the same number.

18. A method of operating a reading machine comprises:
   determining if text in regions of a document correspond to text of a page header or a page footer;
   synthesizing speech to read the document aloud to a user of the reading machine, while ignoring those portions of the document that correspond to a page header or page footer.

19. The method of claim 18 wherein determining if the text is a header and/or footer comprises:
   determining if lines of text on a page correspond to lines of text, at the same position, on pages preceding and succeeding the page.

20. The method of claim 19 wherein determining if lines of text further comprises:
   determining differences, if any, between lines of text on a page correspond to lines of text, at the same position, on pages preceding and succeeding the page.

21. The method of claim 19 wherein determining further comprises:
   preprocessing the lines to remove errors induced by optical character recognition software prior to determining whether the lines match.

22. The method of claim 19 wherein three lines of the current page are compared in sequence to three lines at the same position of preceding and succeeding pages to determine whether the pages contain a header or footer.

23. The method of claim 18 wherein in the lines of the page and the pages preceding and succeeding the page, any numbers in said lines are replaced with the same number.

24. A computer program product residing on a computer readable medium for avoiding page headers/footers while synthesizing speech for a reading machine comprises instructions for causing the reading machine to:
   determine if text in regions of a document correspond to text of a page header or a page footer; and
   synthesize speech to read the document aloud to a user of the reading machine, while ignoring those portions of the document that correspond to a page header or page footer.

25. A reading machine comprises:
   a computer system, said computer system comprising:
   a processor;
   a computer storage medium including a computer program comprising instructions that cause the processor to:
   determine if text in regions of a document correspond to text of a page header or a page footer; and
   synthesize speech to read the document aloud to a user of the reading machine, while ignoring those portions of the document that correspond to a page header or page footer;
   an audio system including speakers to transduce the converted text into speech that is read aloud to the user.

* * * * *